United States Patent [19]

van der Lely

[11] 4,140,185

[45] Feb. 20, 1979

[54] SOIL CULTIVATING IMPLEMENTS

[76] Inventor: Cornelis van der Lely, 7, Brüschenrain, Zug, Switzerland

[21] Appl. No.: 740,201

[22] Filed: Nov. 9, 1976

[30] Foreign Application Priority Data

Nov. 12, 1975 [NL] Netherlands .................. 7513214

[51] Int. Cl.² .................................. A01B 33/16
[52] U.S. Cl. ............................ 172/59; 172/71
[58] Field of Search ............... 172/49, 59, 77, 76, 172/79, 96, 526, 523, 522, 80, 387, 394, 32, 112, 392, 68, 63, 70, 71, 72

[56] References Cited

U.S. PATENT DOCUMENTS

| 2,455,148 | 11/1948 | Traver | 172/70 |
| 3,616,862 | 11/1971 | Lely | 172/68 |

FOREIGN PATENT DOCUMENTS 565501  8/1975  Switzerland .................. 172/70

Primary Examiner—Richard J. Johnson
Attorney, Agent, or Firm—Mason, Mason and Albright

[57] ABSTRACT

A soil cultivating implement has a row of working rotors which are supported by a plurality of elongate, resilient rod-like elements that are arranged to afford a grating immediately to the rear of the rotors. The elements are C-shaped with their convex sides extending in the direction of travel, horizontal lower portions that ride on the ground and upper fastening portions, including coils, that are secured to a beam support. The support, together with elements, are interconnected to the frame via pivoted arms that can be vertically adjusted to change the working depths of the rotors. The elements are positioned at varying distances behind the rotors so that their foremost parts define an imaginary sinusoidal line, when viewed in plan.

14 Claims, 2 Drawing Figures

SOIL CULTIVATING IMPLEMENTS

According to one aspect of the invention, there is provided a soil cultivating implement of the kind set forth, wherein a plurality of at least partly upwardly extending elongate elements are arranged to the rear of the soil working or cultivating members with respect to the intended direction of operative travel of the implement, said elements being disposed alongside one another in such a way as to be capable of being interconnected by an imaginary sinusoidal line as seen in plan.

Figure 1:
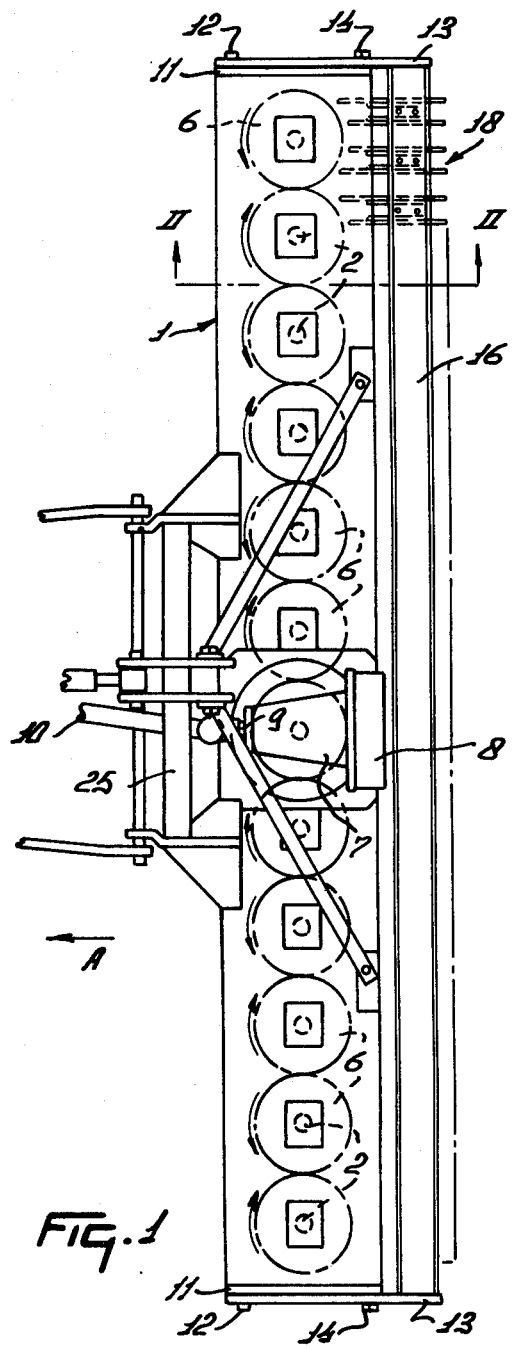
Figure 2:
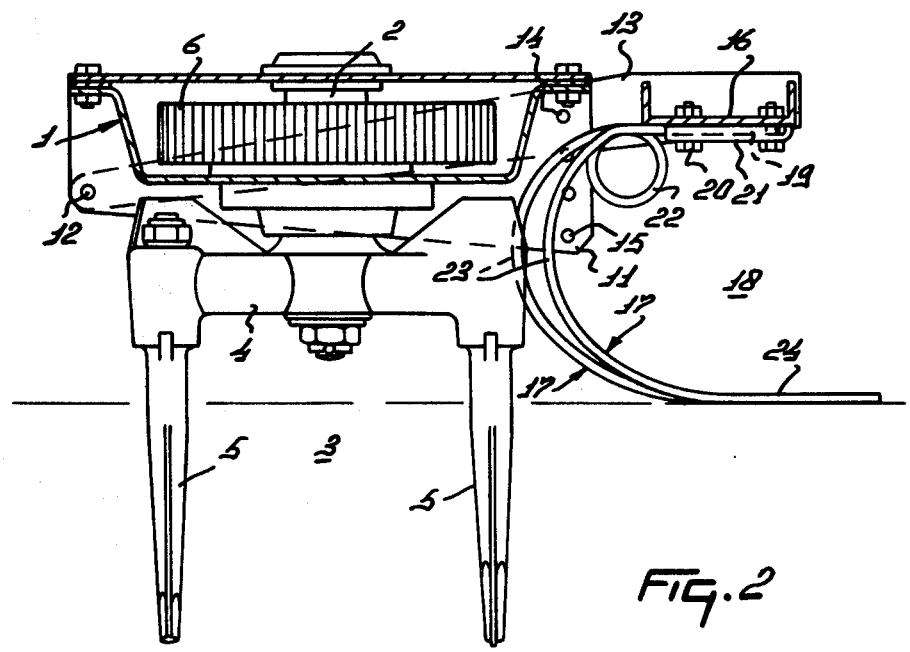

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, and FIG. 2 is a section, to an enlarged scale, taken on the line II—II in FIG. 1.

Referring to the accompanying drawings, the soil cultivating implement that is illustrated comprises a hollow frame portion 1 that extends substantially horizontally transverse, and usually substantially horizontally perpendicular (as illustrated), to the intended direction of operative travel of the implement which is indicated in FIG. 1 of the drawing by an arrow A. A plurality (of which there are twelve in the example that is being described) of substantially vertical, or at least upwardly extending, shafts 2 are rotatably mounted in the hollow box-shaped frame portion 1 in a single row in such a way that the parallel axes of rotation of the successive shafts 2 are spaced apart from one another by distances having magnitudes of substantially 25 centimeters. The shafts 2 project downwardly from beneath a bottom wall of the frame portion 1 and, at that location, each of them has a corresponding rotatable soil working or cultivating member 3 firmly but releasably secured to it by way of a hub having internal splines that co-operate with external splines on the shaft portion concerned and a washer and retaining nut fastened on a short screwthreaded lowermost portion of the shaft under discussion, the nut being provided with a transverse split pin or the like that is entered through a transverse bore in said screwthreaded portion to ensure that vibration during use of the implement will not work the nut loose. In fact, the internally splined hub that has just been referred to is arranged at the center of a substantially horizontally disposed tine support 4 whose opposite free ends are integrally or rigidly furnished with sleeve-like tine holders in which fastening portions of rigid soil working tines 5 are firmly but releasably retained by nuts of which one can be seen at the left side of the soil working or cultivating member 3 that is visible in FIG. 2 of the drawings. The soil working portions of the tines 5 extend downwardly from the lower ends of the fastening portions thereof and penetrate into the soil when the implement is in use, as shown in FIG. 2, to a depth that is dependent principally upon means that will be described and discussed below. The fastening and soil working portions of each tine 5 are both substantially straight and are integrally interconnected at substantially the level of the lowermost end of the corresponding holder, the junction between the longitudinal axes of the two portions being an inclined one which is such that the soil working portion trails rearwardly from top to bottom with respect to the intended direction of operative rotation of the corresponding member 3 (see the small arrows that indicate the intended directions of operative rotation of the members 3 in FIG. 1). The inclination of the longitudinal axis of the soil working portion of each tine 5 to the longitudinal axis of the corresponding fastening portion is not large and may advantageously, but not essentially, have a magnitude of substantially 8°. It will be noted from FIG. 2 of the drawings that, with respect to the intended direction of operative rotation of each member 3, the top of each tine support 4 and the tops of the corresponding two tine holders are integrally provided with upright shields which lie in front of screwthreaded uppermost parts of the fastening portions of the tines and their co-operating retaining nuts so as to protect those parts and nuts from damage by impacts against stones and the like that may be met with in the soil during the operation of the implement.

Although there are twelve of the shafts 2 in the example that is being described, it is emphasised that a greater, or lesser, number of the shafts 2 may be provided, if desired, together with a corresponding number of the soil working or cultivating members 3. Each of the twelve or other number of shafts 2 is provided, inside the hollow frame portion 1, with a corresponding straight-toothed or spur-toothed pinion 6, said pinions 6 being so dimensioned and arranged that the teeth of each of them are in mesh with the teeth of the neighbouring pinion 6, or both of the two neighbouring pinions 6, in the single row thereof. It will be realised that, with this arrangement, each shaft 2 and the corresponding member 3 will, during the use of the implement, revolve in an opposite direction to that of the immediately neighbouring shaft 2 and member 3 or both of the immediately neighbouring shafts 2 and members 3. One of the center pair of shafts 2 of the single row thereof has an upward extension through a top wall of the hollow frame portion 1 into a gear box 7 that is mounted on top of said frame portion 1 by bolts or other fastening members. Bevel pinions that are not visible in the accompanying drawings but that are located inside said gear box 7 place the upward shaft extension in driven connection with a substantially horizontal shaft that is substantially parallel to the direction A and that is also not visible in the drawings. The gear box 7 comprises a further shaft 9 that lies above the shaft which has just been referred to in substantially horizontally parallel relationship with that shaft and with the direction A. The rearmost ends of both the shaft 9 and the underlying shaft that is parallel thereto project through the back of the gear box 7 into a change-speed gear 8. It is not necessary to describe the change-speed gear 8 in any detail but, briefly, it comprises pairs of straight-toothed or spur-toothed pinions of different sizes whose internally splined hubs co-operate interchangeably and exchangeably with the matchingly splined rear ends of the shaft 9 and the underlying parallel shaft to give transmission ratios between those shafts that are dependent upon the particular co-operating pair of pinions that is chosen and their arrangement relative to the shaft ends. The leading end of the shaft 9 projects forwardly from the front of the gear box 7 in substantially the direction A where it is splined or otherwise keyed to enable it to be placed in driven connection with the power take-off shaft at the rear of an agricultural tractor or other operating vehicle by way of an intermediate telescopic transmission shaft 10, which is of a construction that is known per se, having universal joints at its opposite ends. The speed of rotation of the shafts 2 and soil working or cultivating members 3 in response to a more or less constant input speed of rotation applied to the leading end of the shaft 9 can be changed, as required, by selecting an appropriate pinion arrangement inside the change-speed gear 8.

The opposite ends of the hollow box-shaped frame portion 1 are closed by sector-shaped side plates 11 that are substantially vertically disposed in parallel relationship with one another and substantially parallel relationship with the direction A, the rear edges of the plates 11 with respect to the direction A having a greater vertical extent than do the leading edges (see FIG. 2). Substantially horizontally aligned stub shafts 12 are provided close to the lower leading corners of the two side plates 11 and arms 13 that extend rearwardly from said stub shafts are turnable upwardly and downwardly thereabout alongside the relatively remote surfaces of the two plates 11. Each side plate 11 is formed, close to its rear upright edge, with a row of holes 15 that are equidistant from the axis defined by the substantially horizontally aligned stub shafts 12. Each arm 13 is formed with at least one hole that is at the same distance from said axis as are the holes 15 and locking pins 14, or equivalent locking bolts, are provided for entry through the holes, or chosen holes, in the arms 13 and through selected holes 15 to retain the arms 13 in a corresponding angular position about the axis defined by the stub shafts 12. A support 16 in the form of a beam of channel-shaped cross-section extends substantially horizontally parallel to the hollow frame portion 1 and rigidly interconnects rear portions of the two arms 13 that project behind the side plates 11. It can be seen from FIG. 2 of the drawings that the beam of channel-shaped cross-section that affords the support 16 is arranged with its web or base in a horizontal or substantially horizontal setting, the two limbs of the beam projecting upwardly therefrom in perpendiculair relationship with the general plane of the web or base. The bottom of the support 16 is provided with a supporting member of the implement which supporting member is generally indicated by the reference 18. The supporting member 18 comprises a plurality of upwardly extending elements 17 that are preferably formed from resilient rod-shaped material, such as spring steel, or circular or substantially circular cross-section. It can be seen from FIG. 1 of the drawings that the supporting member 18 extends throughout the working width of the row of twelve soil working or cultivating members 3, the elements 17 which principally afford said member 18 being spaced apart from one another along the support 16 by short distances which may conveniently, but not essentially, have magnitudes of substantially 5–3 centimeters. It will be evident that the angular positions of the arms 13 that are chosen about the axis defined by the stub shafts 12 also control the angular position of the supporting member 18 about that axis, this position being a principal factor in determining the maximum depth of penetration of the tines 5 into the soil which is possible during the operation of the implement. Each upwardly extening element 17 comprises a fastening portion 19 that is clamped to the lower surface of the web or base of the support 16 by a pair of bolts 20 and a co-operating shaped clamping plate 21. Each fastening portion 19 terminates, at its leading end with respect to the direction A, in a coil 22 that has not less than one complete 360° turn. The end of the coil 22 remote from the fastening portion 19 merges into the upper end of a downwardly bent-over portion 23 that is substantially C-shaped as seen in FIG. 2 of the drawings. Thus, said portion 23 is initially directed forwardly and downwardly from the coil 22 whereas, close to its lowermost end, it is directed downwardly and rearwardly. The lowermost end of each downwardly bent-over portion 23 terminates in a substantially rectilinear and substantially horizontally disposed portion 24 that bears against the ground surface during operation of the implement in substantially parallel relationship with the direction A. It is preferred that, as illustrated, each fastening portion 19, coil 22, downwardly bent-over portion 23 and horizontal portion 24 should be formed integrally from a single length of resilient material. Spring steel rod of circular or substantially circular cross-section is particularly suitable for this purpose.

It can be seen from both FIGS. 1 and 2 of the drawings that the downwardly bent-over portions 23 of neighbouring elements 17 are not of exactly the same shape, the curvature varying from element to element in such a way that the midpoints of the portions 23 are located on imaginary arcuately curved lines whose centers of curvature substantially coincide with the axes of rotation of the most closely neighbouring shafts 2, and thus with the centers of the circular paths that are traced by the tines 5 of the respective members 3 when the implement is in use. Thus, those element portions 23 that are substantially in register with shafts 2 in the direction A have their midpoints located furthest rearwardly with respect to that direction whereas those elements 23 which are substantially in register, in the direction A, with locations midway between the shafts 2 have their midpoints disposed furthest forwardly with respect to the direction A, the portions 23 of other elements 17 being intermediate between those two extremes as regards their curvatures. As seen in plan view (FIG. 1), the midpoints of the element portions 23 can be interconnected by an imaginary sinusoidal line and, in fact, the elements 17 (particularly their portions 23) form a grille or grating that is so close to the paths that are traced by the tines 5 of the members 3 that they co-operate with those tines in working the soil when the implement is in operation.

The front of the hollow frame portion 1 with respect to the direction A is provided with a coupling member or trestle 25 that is of generally triangular configuration when seen in front or rear elevation, substantially the apex of said coupling member or trestle 25 being connected to spaced locations at the top and rear of the hollow frame portion 1 by downwardly and rearwardly divergent strengthening tie beams. In the use of the implement, its coupling member or trestle 25 is connected to the three-point lifting device or hitch at the rear of an agricultural tractor or other operating vehicle in the generally known manner that is illustrated in outline in FIG. 1 of the drawings. The known telescopic transmission shaft 10 is employed to place the power take-off shaft of the same tractor or other operating vehicle in driving connection with the forwardly projecting splined or otherwise keyed end of the shaft 9 of the gear box 7. The change-speed gear 8 is adjusted having regard to the nature and condition of the soil that is to be worked and the fineness thereof that is required after treatment. The maximum depth to which the tines 5 can penetrate into the soil is adjusted, before work commences, by entering the locking pins 14 or equivalent locking bolts through the holes, or chosen holes, in the arms 13 and through selected holes 15 in the manner that has been described above. As the implement moves in the direction A over soil that is to be cultivated, the soil working or cultivating members 3 are power-driven to revolve in the directions that are indicated by the small arrows in FIG. 1 of the drawings which directions, as discussed above, are alternately opposite to one another. The tines 5 of each member 3 work an individual strip of soil whose width is slightly greater that is the distance between the axes of rotation of immediately neighbouring shafts 2 so that, in effect, the twelve members 3 will work a single broad strip of land having a width, in this particular example, of substantially 3 meters.

In addition to performing its supporting function, the member 18 includes the grille or grating that is formed by the elements 17, particularly their portions 23. The sinusoidal, in plan view, grille or grating resiliently supports the implement from the ground surface and, as previously mentioned, is very close indeed to the paths of movement of the tines 5 of the members 3. Soil that is displaced rearwardly with respect to the direction A by the tines 5 of the rotating soil working or cultivating members 3 comes into contact with the grille or grating and passes through the spaces between the element portions 23 thereof. Any stones or hard lumps of soil are too large to pass through these openings slide downwardly along the lower parts of the portions 23 and are pressed into the soil by the substantially horizontal portions 24. The more finely divided soil that can pass readily through the openings between the element portions 23 drops onto the top of the substantially horizontal portions 24 where it is left behind to cover any larger stones or the like. The portions 24 slide forwardly over the ground when the machine is in use and are the portions of the supporting member 18 that actually give the required support from the ground surface. The finely divided soil that escapes through the grille or grating is left as an uppermost layer of earth that is substantially uniform thickness throughout the working width of the implement, any tendency for the members 3 to form ridges that extend in the direction A being greatly minimised if not completely eliminated.

Although certain features of the soil cultivating implement that has been described and/or that is illustrated in the accompanying drawings will be set forth in the following claims as inventive features, it is emphasised that the invention is not necessarily limited to those features and that it includes within its scope each of the parts of the soil cultivating implement that has been described, and/or that is illustrated in the accompanying drawings, both individually and in various combinations.

What I claim is:

1. A soil cultivating implement comprising a frame and a plurality of soil working members rotatably mounted on a portion of said frame, said soil working members being arranged in a row that extends transverse to the direction of travel, a plurality of curved elongate ground engaging elements being interconnected to said frame portion by arm means and said elements being laterally spaced apart from one another by short distances at the rear of said soil working members, the foremost parts of said elements being located at varying distances from a plane that extends perpendicular to the direction of travel whereby, an imaginary sinusoidal line interconnects said foremost portions, when the implement is viewed in plan.

2. An implement as claimed in claim 1, wherein said elements are arranged closely adjacent the paths traced by the rotating soil working members during operation.

3. An implement as claimed in claim 1, wherein said elements are positioned to form a supporting member that supports at least the rear of said implement.

4. An implement as claimed in claim 1, wherein said arm means and elements are vertically adjustable in position relative to said soil working members.

5. A soil cultivating implement comprising a frame and a plurality of soil working members rotatably mounted on a portion of said frame, said soil working members being arranged in a row that extends transverse to the direction of travel, a plurality of curved elongated ground engaging elements being mounted on an elongated support that is interconnected to said frame portion by arm means said elements being laterally spaced apart from one another by short distances to form a grating immediately to the rear of said soil working members, said soil working members being rotatable about corresponding upwardly extending axes and driving means connected to rotate said members, said arm means with support and elongate elements being fixable in chosen vertical positions relative to said soil working members, said elements supporting the rear of said implement and controlling the working depths of said members, each of said elements comprising a lower substantially horizontal portion that slides over the ground surface during operation to press stones and other hard objects into the ground said elements having upwardly extending portions that are curved forwardly and positioned alongside one another, foremost parts of the upwardly extending portions of some of the elements being located at varying distances from a plane that extends horizontally perpendicular to the direction of travel.

6. An implement as claimed in claim 5, wherein said foremost parts are positioned along an imaginary sinusoidal line, when viewed in plan.

7. An implement as claimed in claim 5, wherein each element includes a coil located adjacent its fastening portion that is connected to said support and the latter extends transverse to the direction of travel parallel to said frame portion.

8. An implement as claimed in claim 7, wherein said support is a beam of channel-shaped cross-section with limbs projecting upwardly, away from a base.

9. An implement as claimed in claim 7, wherein said elements, including their coils, are formed from single lengths of resilient material.

10. An implement as claimed in claim 7, wherein at least four of said elements are arranged alongside one another in a region in register with the working width of one of said soil working members.

11. An implement as claimed in claim 10, wherein two of said four elements are arranged alongside one another substantially in register with the axis of rotation of said one soil working member, the foremost parts of said two elements being spaced substantially equal distances from the path traced by said one member during operative rotation thereof.

12. An implement as claimed in claim 11, wherein a pair of said four elements are in register with regions that are substantially midway between the axes of rotation of neighboring soil working members, having their foremost parts located further forwardly than the foremost parts of two corresponding elements substantially in register with the axes of rotation of the neighboring soil working members.

13. An implement as claimed in claim 12, wherein said pair of elements have their foremost parts in that direction located at substantially equal distances from paths traced by the respective two neighboring members during operative rotation thereof.

14. An implement as claimed in claim 5, wherein said elements are C-shaped when viewed from aside and the rearmost ends of the horizontal portions are substantially equal in length.

* * * * *